United States Patent
Kon

(10) Patent No.: US 11,428,878 B2
(45) Date of Patent: Aug. 30, 2022

(54) OPTICAL RECEPTACLE AND OPTICAL MODULE

(71) Applicant: Enplas Corporation, Saitama (JP)

(72) Inventor: Ayano Kon, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 16/979,188

(22) PCT Filed: Mar. 7, 2019

(86) PCT No.: PCT/JP2019/009108
§ 371 (c)(1),
(2) Date: Sep. 9, 2020

(87) PCT Pub. No.: WO2019/172376
PCT Pub. Date: Sep. 12, 2019

(65) Prior Publication Data
US 2020/0409000 A1 Dec. 31, 2020

(30) Foreign Application Priority Data
Mar. 9, 2018 (JP) .............................. JP2018-043174

(51) Int. Cl.
*G02B 6/42* (2006.01)

(52) U.S. Cl.
CPC ......... *G02B 6/4214* (2013.01); *G02B 6/4286* (2013.01)

(58) Field of Classification Search
CPC .............................. G02B 6/4286; G02B 6/4214
(Continued)

(56) References Cited

U.S. PATENT DOCUMENTS 4,733,065 A * 3/1988 Hoshi ............... G11B 11/10541
369/112.13
4,737,896 A * 4/1988 Mochizuki ........... G02B 6/0068
362/335
(Continued)

FOREIGN PATENT DOCUMENTS

CN 203149161 U 8/2013
CN 107209334 A 9/2017
(Continued)

OTHER PUBLICATIONS

International Search Report from International Application No. PCT/JP2019/009108, dated May 28, 2019.

*Primary Examiner* — Kaveh C Kianni
(74) *Attorney, Agent, or Firm* — Brundidge & Stanger, P.C.

(57) ABSTRACT

An optical receptacle includes a first optical surface, a second optical surface, and an attenuation portion. The attenuation portion includes a plurality of first reflection parts and a plurality of second reflection parts. The plurality of first reflection parts reflects a portion of light incident on the first optical surface toward the second optical surface. The second reflection parts reflect the other portion of light incident on the first optical surface in directions other than the direction toward the second optical surface. The first reflection parts and the second reflection parts are alternately disposed along a direction perpendicular to the optical axis between the first optical surface and the first reflection parts and perpendicular to the optical axis between the first reflection parts and the second optical surface.

16 Claims, 9 Drawing Sheets

(58) Field of Classification Search
USPC .......................................................... 385/31
See application file for complete search history.

(56) References Cited

U.S. PATENT DOCUMENTS

| | | | | |
|---|---|---|---|---|
| 8,787,714 | B2* | 7/2014 | Morioka | G02B 6/4246 |
| | | | | 385/35 |
| 9,470,857 | B2* | 10/2016 | Shah | G02B 6/4246 |
| 2004/0202477 | A1* | 10/2004 | Nagasaka | G02B 6/4214 |
| | | | | 398/138 |
| 2005/0147353 | A1* | 7/2005 | Vancoill | G02B 6/4204 |
| | | | | 385/47 |
| 2008/0163688 | A1* | 7/2008 | Wang | G01N 29/022 |
| | | | | 73/580 |
| 2014/0299752 | A1* | 10/2014 | Huang | G01J 1/0425 |
| | | | | 362/327 |
| 2015/0020964 | A1 | 1/2015 | Tanazawa | |
| 2016/0172821 | A1 | 6/2016 | Azadeh | |
| 2016/0282572 | A1* | 9/2016 | Shah | G02B 6/4257 |
| 2017/0371111 | A1* | 12/2017 | Morioka | G02B 6/4286 |
| 2019/0094475 | A1* | 3/2019 | Morioka | G02B 6/4206 |

FOREIGN PATENT DOCUMENTS

| | | |
|---|---|---|
| CN | 108780197 A | 11/2018 |
| JP | 2013-156440 A | 8/2013 |

\* cited by examiner

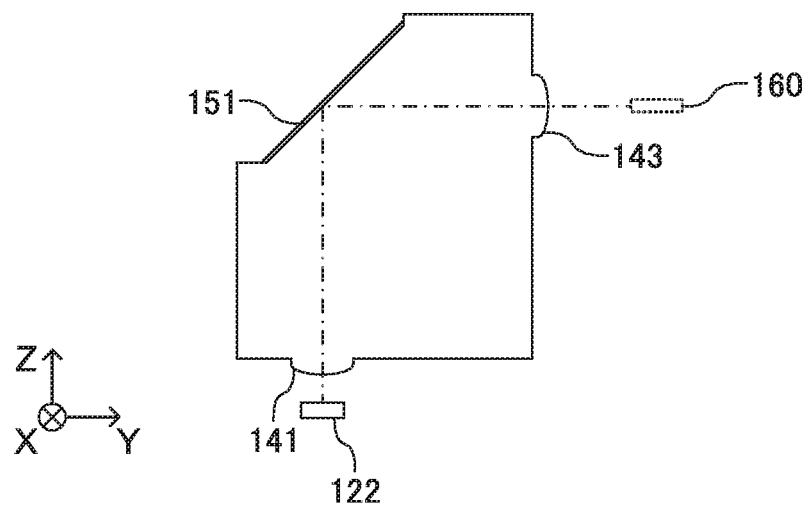
FIG. 5A
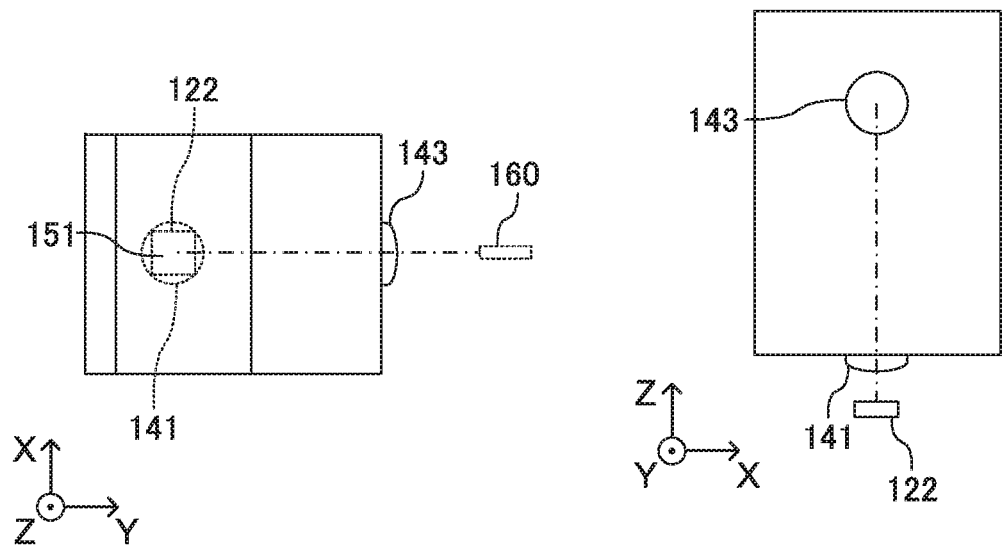
FIG. 5B
FIG. 5C

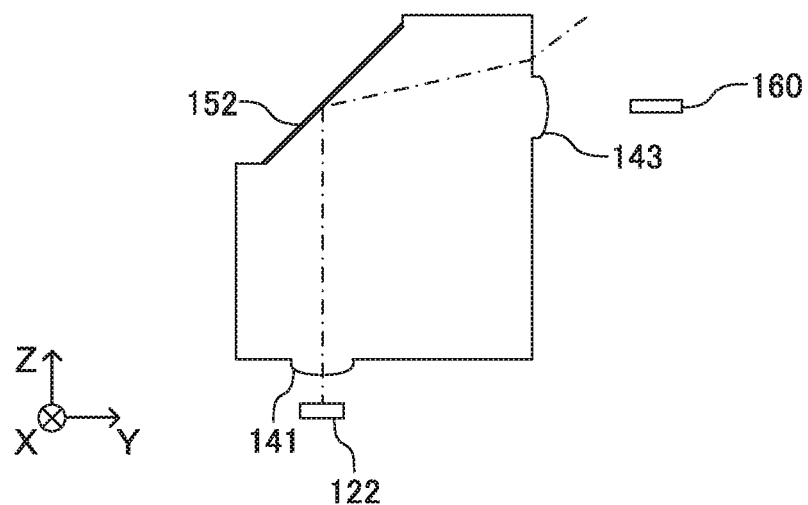
FIG. 6A
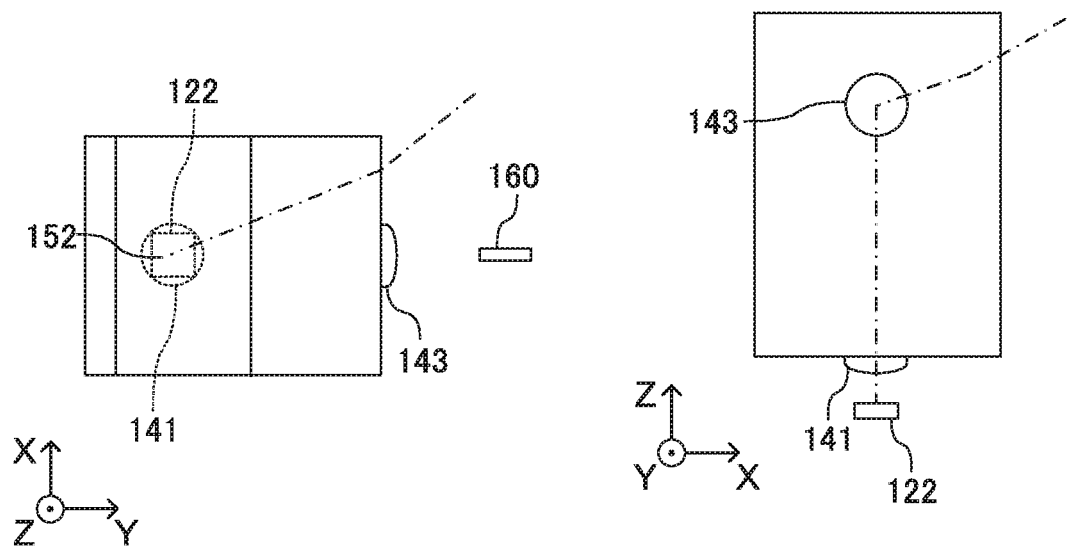
FIG. 6B
FIG. 6C

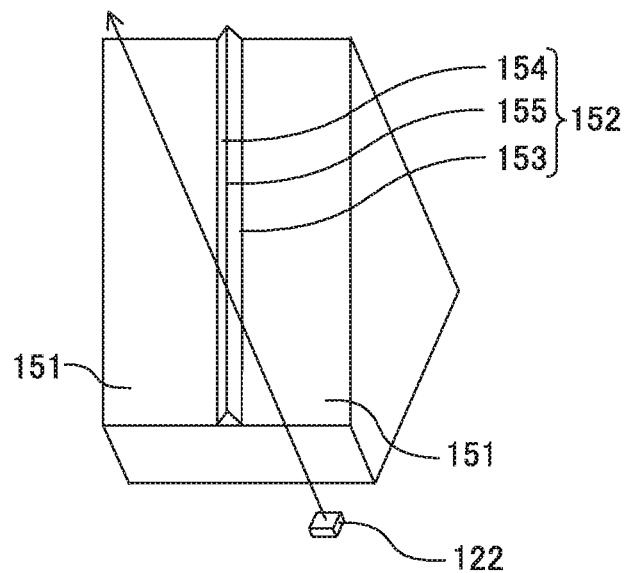
FIG. 7A
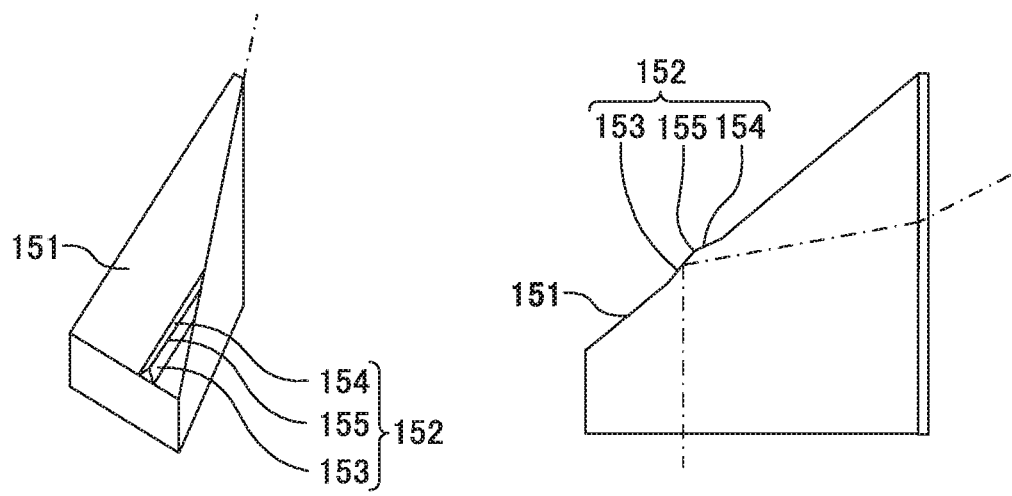
FIG. 7B
FIG. 7C

OPTICAL RECEPTACLE AND OPTICAL MODULE

TECHNICAL FIELD

The present invention relates to an optical receptacle and an optical module.

BACKGROUND ART

In the related art, an optical module including a light emission element such as a vertical cavity surface emitting laser (VCSEL) has been used for optical communications using an optical transmission member such as an optical fiber and a light waveguide. The optical module includes one or more photoelectric conversion elements (light emission elements or light reception elements), and a light coupling element (hereinafter referred to also as "optical receptacle") configured for transmission, for reception, or for transmission and reception.

In addition, in an optical module for optical communication, it is necessary to attenuate the quantity of light emitted from a transmitting optical receptacle from the view point of safety, and therefore an optical filter that attenuates the quantity of light emitted from the transmitting optical receptacle is used in some cases (see, for example, PTL 1). In addition, an attenuation coating that attenuates light emitted from a transmitting optical receptacle is provided to an optical surface in some cases.

The optical receptacle disclosed in PTL 1 includes an optical receptacle body and an optical filter (e.g., light attenuation filter). The optical receptacle body includes lens surfaces arranged in one line at even intervals in the bottom surface, and optical surfaces disposed opposite the lens surfaces. The optical filter is disposed on a part of the optical surface. The optical receptacle disclosed in PTL 1 is used in the state where a photoelectric conversion device including a plurality of light emission elements and a plurality of light reception elements are disposed on the lens surface side, and a plurality of optical transmission members is disposed on the optical surface side. In the optical receptacle disclosed in PTL 1, the optical filter is disposed on the light path of the light from light emission element that enters the optical transmission member light, and thus the quantity of light emitted from the optical receptacle on the transmission side can be attenuated.

CITATION LIST

Patent Literature

PTL 1
Japanese Patent Application Laid-Open No. 2013-156440

SUMMARY OF INVENTION

Technical Problem

Normally, in an optical receptacle including an optical filter, the optical filter has a sufficiently large size so that light that fails to impinge on the optical filter is not generated. However, when the optical filter is excessively large in the case where the optical filter is disposed only in the portion functioning as the transmission side in a transmitting and receiving optical module, the optical filter may be present also at the portion functioning as the reception side. In addition, in an optical surface provided with an attenuation coating, the attenuation coating may be cracked, and attenuation of light may not be achieved.

Given the above, an object of the present invention is to provide an optical receptacle that can attenuate light emitted from the photoelectric conversion element without using other members such as an optical filter and an attenuation coating. In addition, another object of the present invention is to provide an optical module including the optical receptacle.

Solution to Problem

An optical receptacle of an embodiment of the present invention is configured to optically couple one or more light emission elements and an end surface of one or more optical transmission members when the optical receptacle is disposed between the one or more optical transmission members and a photoelectric conversion device in which the one or more light emission elements are disposed on a substrate, the optical receptacle including: one or more first optical surfaces configured to allow incidence of light emitted from the one or more light emission elements; one or more second optical surfaces configured to emit, toward the one or more optical transmission members, light emitted from the one or more light emission elements and travelled inside the optical receptacle; an attenuation part configured to reflect, toward the one or more second optical surfaces, a first part of light entered from the one or more first optical surfaces, and reflect, toward a part other than the one or more second optical surfaces, a second part of the light entered from the one or more first optical surfaces. The attenuation part includes a plurality of first reflection parts configured to reflect, toward the one or more second optical surfaces, the first part of the light entered from the one or more first optical surfaces, and a plurality of second reflection parts configured to reflect, toward the part other than the one or more second optical surfaces, the second part of the light entered from the one or more first optical surfaces. The plurality of first reflection parts and the plurality of second reflection parts are alternately disposed in a direction perpendicular to an optical axis of light between the one or more first optical surfaces and the plurality of first reflection parts and to an optical axis of light between the plurality of first reflection parts and the one or more second optical surfaces. The plurality of first reflection parts and the plurality of second reflection parts extend along a plane including the optical axis of the light between the one or more first optical surfaces and the plurality of first reflection parts, and the optical axis of the light between the plurality of first reflection parts and the one or more second optical surfaces.

An optical module of an embodiment of the present invention includes: a photoelectric conversion device including a substrate and one or more light emission elements disposed on the substrate; and the optical receptacle.

Advantageous Effects of Invention

The optical receptacle of embodiments of the present invention can attenuate the light emitted from the light emission element without using other members.

BRIEF DESCRIPTION OF DRAWINGS

FIGS. 5A to 5C illustrate light paths for describing reflection at a first reflection part;

FIGS. 6A to 6C illustrate light paths for describing reflection at a second reflection part;

FIGS. 7A to 7C also illustrate light paths for describing reflection at the second reflection part;

DESCRIPTION OF EMBODIMENTS

An optical receptacle and an optical module according to embodiments of the present invention are elaborated below with reference to the accompanying drawings.

Embodiment 1

Configuration of Optical Module

Figure 1:
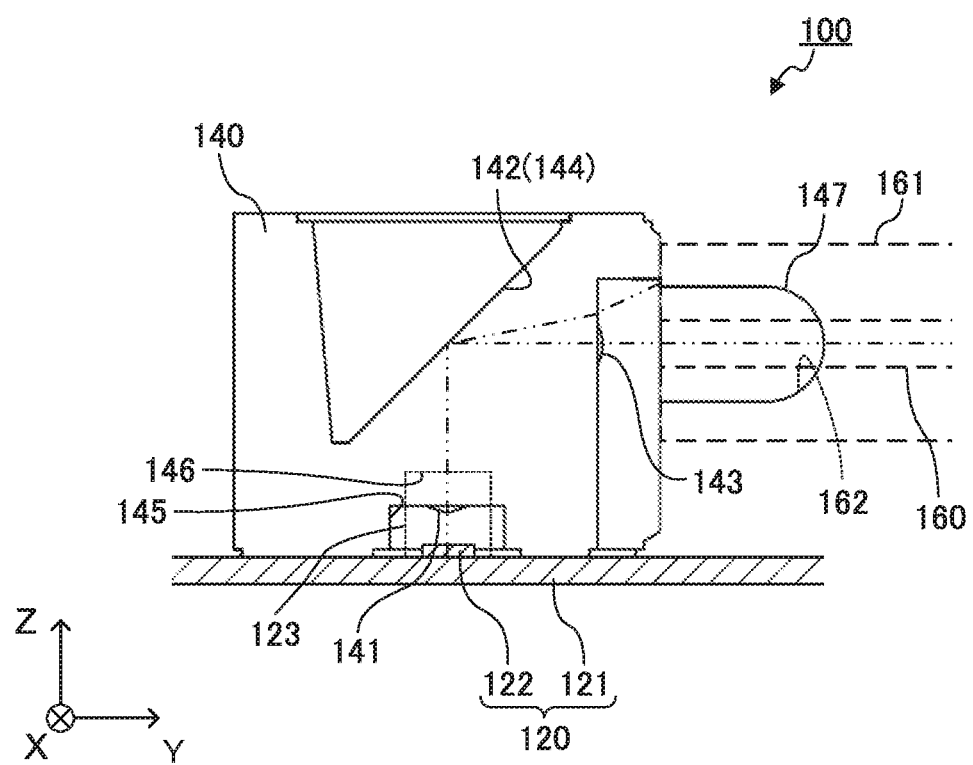
FIG. 1 is a sectional view of an optical module according to Embodiment 1.

FIG. 1 is a sectional view of optical module 100 according to Embodiment 1 of the present invention. In FIG. 1, hatching on the cross-section of optical receptacle 140 is omitted to illustrate light paths in optical receptacle 140.

Note that, in the following description, the direction in which a plurality of first optical surfaces 141 is arranged is referred to as "X direction", the direction perpendicular to the X axis on a plane on which the plurality of first optical surfaces 141 is arranged is referred to as "Y direction", and the direction perpendicular to the X direction and the Y direction is referred to as "Z direction". In addition, a plane including an axis extending along the X direction and an axis extending along the Y direction is referred to as "XY plane", a plane including an axis extending along the X direction and an axis extending along the Z direction is referred to as "XZ plane", and a plane including an axis extending along the Y direction and an axis extending along Z direction is referred to as "YZ plane". Note that FIG. 1 is a sectional view of optical module 100 in the YZ plane.

As illustrated in FIG. 1, optical module 100 includes photoelectric conversion device 120 and optical receptacle 140. Optical transmission member 160 is connected to optical receptacle 140 when optical module 100 is used.

Photoelectric conversion device 120 includes substrate 121 and one or more photoelectric conversion elements 122. Photoelectric conversion element 122 and optical receptacle 140 are disposed on substrate 121. Substrate-side protrusion 123 corresponding to positioning recess 146 of optical receptacle 140 described later is formed on substrate 121. By fitting positioning recess 146 to substrate-side protrusion 123, optical receptacle 140 can be positioned at a predetermined position with respect to photoelectric conversion element 122 disposed on substrate 121. The material of substrate 121 is not limited. Examples of substrate 121 include a glass composite substrate and a glass epoxy substrate.

Photoelectric conversion element 122 is a light emission element or a light reception element, and is disposed on substrate 121. In the case where optical module 100 is a transmitting optical module, photoelectric conversion element 122 is a light emission element. In the case where optical module 100 is a receiving optical module, photoelectric conversion element 122 is a light reception element. Since optical module 100 according to the present embodiment is a transmitting and receiving optical module, photoelectric conversion device 120 includes four light emission elements and four light reception elements as photoelectric conversion elements 122. The light emission element is a vertical cavity surface emitting laser (VCSEL), for example. The light reception element is a photodetector, for example.

Optical receptacle 140 is disposed on substrate 121 in such a manner as to face photoelectric conversion element 122. Optical receptacle 140 optically couples photoelectric conversion element 122 and the end surface of optical transmission member 160 in the state where optical receptacle 140 is disposed between photoelectric conversion element 122 and optical transmission member 160. As in the present embodiment, in transmitting and receiving optical module 100, optical receptacle 140 allows entry of light emitted from the light emission element serving as photoelectric conversion element 122 so as to emit the light toward the end surface of optical transmission member 160, and allows entry of light emitted from the end surface of optical transmission member 160 so as to emit the light toward the light reception element serving as photoelectric conversion element 122.

The type of optical transmission member 160 is not limited. Examples of the type of optical transmission member 160 include an optical fiber and a light waveguide. Optical transmission member 160 is connected to optical receptacle 140 through ferrule 161. Ferrule-side recess 162 corresponding to positioning protrusion 147 of optical receptacle 140 described later is formed in ferrule 161. By fitting ferrule-side recess 162 to positioning protrusion 147, the end surface of optical transmission member 160 can be fixed at a predetermined position with respect to optical receptacle 140. In the present embodiment, optical transmission member 160 is an optical fiber. In addition, the optical fiber may be of a single mode type, or a multiple mode type.

Configuration of Optical Receptacle

Figures 2A, 2C:
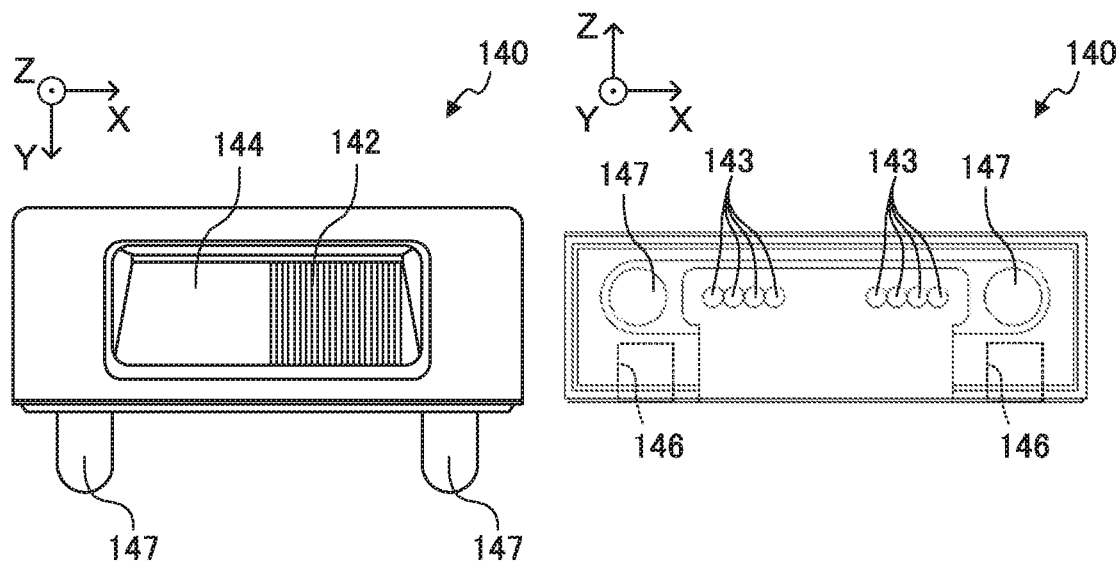
FIGS. 2A to 2D illustrate a configuration of an optical receptacle.
Figures 2B, 2D:
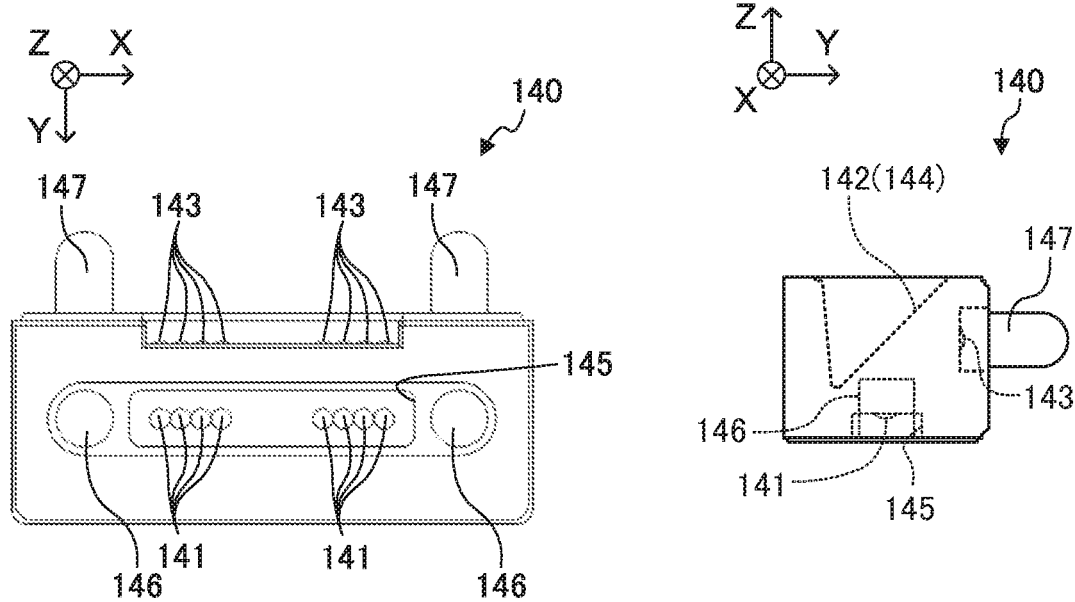

FIG. 2 illustrates a configuration of optical receptacle 140 according to the embodiment. FIG. 2A is a plan view of optical receptacle 140, FIG. 2B is a bottom view, FIG. 2C is a front view, and FIG. 2D is a left side view.

As illustrated in FIGS. 2A to 2D, optical receptacle 140 is a member having a substantially cuboid shape. Optical receptacle 140 includes a plurality of first optical surfaces 141, attenuation part 142, and a plurality of second optical surfaces 143. Attenuation part 142 includes a plurality of first reflection parts 151 and a plurality of second reflection parts 152 described later. Note that, as described above, since optical module 100 according to the present embodiment has a transmitting function and a receiving function, optical receptacle 140 includes reflecting surface 144 for reflecting, toward first optical surface 141, the light entered from second optical surface 143.

Optical receptacle 140 is formed of a material that is optically transparent to light of wavelengths used for optical communications. Examples of the material of optical receptacle 140 include transparent resins such as polyetherimide (PEI) and cyclic olefin resin. In addition, optical receptacle 140 can be produced by injection molding, for example.

First optical surface 141 is an optical surface that allows, to enter optical receptacle 140, the light emitted from the light emission element serving as photoelectric conversion element 122, or emits, toward the light reception element serving as photoelectric conversion element 122, the light entered from second optical surface 143 and reflected at reflecting surface 144. First optical surface 141 is disposed in the bottom surface of optical receptacle 140 such that first optical surface 141 can face each photoelectric conversion element 122. The plurality of (eight) first optical surfaces 141 is arranged in a direction (X direction) orthogonal to the optical axis of the light between first optical surface 141 and attenuation part 142 (Z direction) and the optical axis of the light between attenuation part 142 and second optical surface 143 (Y direction). In addition, in the present embodiment, the plurality of (eight) first optical surfaces 141 is disposed in a line in the bottom surface of housing part 145. In FIG. 2B, the four first optical surfaces 141 on the right side are transmitting first optical surfaces 141, and the four first optical surfaces 141 on the left side are receiving first optical surfaces 141.

The shape of first optical surface 141 is not limited. In the present embodiment, first optical surface 141 has a shape of a convex lens surface protruding toward photoelectric conversion element 122. In addition, first optical surface 141 has a circular shape in plan view. Preferably, the central axis of first optical surface 141 is perpendicular to the light-emitting surface or the light-receiving surface of photoelectric conversion element 122 (and the surface of substrate 121). In addition, preferably, the central axis of first optical surface 141 coincides with the optical axis of the light emitted from the light emission element serving as photoelectric conversion element 122, or the light incident on the light reception element serving as photoelectric conversion element 122.

Attenuation part 142 reflects, toward second optical surface 143, a part of the light entered from first optical surface 141, and reflects, toward the part other than second optical surface 143, the other part of the light entered from first optical surface 141. Attenuation part 142 is tilted such that the distance to optical transmission member 160 (front surface) decreases in the direction from the bottom surface toward the top surface of optical receptacle 140 in its entirety. Attenuation part 142 is disposed at a position where the light emitted from light emission element and entered from first optical surface 141 arrives. Attenuation part 142 is elaborated later.

Second optical surface 143 is an optical surface that emits, toward the end surface of optical transmission member 160, the light entered from first optical surface 141 and reflected at attenuation part 142, or allows, to enter optical receptacle 140, light emitted from the end surface of optical transmission member 160. The plurality of second optical surfaces 143 is disposed in the front surface of optical receptacle 140 such that each second optical surface 143 faces the end surface of optical transmission member 160. Second optical surface 143 is arranged in the direction (X direction) orthogonal to the optical axis of the light between first optical surface 141 and attenuation part 142 (Z direction) and the optical axis of the light between attenuation part 142 and second optical surface 143 (Y direction). In the present embodiment, eight second optical surfaces 143 are disposed in a line. In FIG. 2C, the four second optical surfaces 143 on the right side are transmitting second optical surfaces 143, and the four second optical surfaces 143 on the left side are receiving second optical surfaces 143.

The shape of second optical surface 143 is not limited. In the present embodiment, second optical surface 143 has a shape a convex lens surface protruding toward the end surface of optical transmission member 160. Preferably, the central axis of second optical surface 143 coincides with the central axis of the end surface of optical transmission member 160.

In the arrangement direction (X direction) of second optical surfaces 143, positioning protrusions 147 are disposed to sandwich the second optical surfaces 143 therebetween. As described above, positioning protrusion 147 is fitted to ferrule-side recess 162 formed in ferrule 161 of optical transmission member 160. In conjunction with ferrule-side recess 162, positioning protrusion 147 fixes the end surface of optical transmission member 160 at a desired position with respect to second optical surface 143. The shape and size of positioning protrusion 147 are not limited as long as the above-described effects can be achieved. In the present embodiment, positioning protrusion 147 is a protrusion having a substantially columnar shape.

In arrangement direction (X direction) of first optical surfaces 141, positioning recesses 146 are disposed to sandwich first optical surfaces 141 therebetween. As described above, positioning recess 146 is fitted to substrate-side protrusion 123 formed in substrate 121. In conjunction with substrate-side protrusion 123, positioning recess 146 fixes first optical surface 141 at a desired position with respect to photoelectric conversion element 122. The shape and size of positioning recess 146 are not limited as long as the above-described effects can be achieved. In the present embodiment, positioning recess 146 is a recess having a substantially columnar shape.

Reflecting surface 144 reflects, toward first optical surface 141, light entered from second optical surface 143. Reflecting surface 144 is tilted such that the distance to optical transmission member 160 (front surface side) decreases in the direction from the bottom surface toward the top surface of optical receptacle 140. The inclination angle of reflecting surface 144 is not limited. In the present embodiment, the inclination angle of reflecting surface 144 is 45° with respect to the optical axis of light incident on reflecting surface 144. The shape of reflecting surface 144 is not limited. In the present embodiment, reflecting surface 144 has a shape of a flat surface. At least a part of the light entered from second optical surface 143 impinges on reflecting surface 144 at an incident angle greater than a critical angle. Attenuation part 142 is disposed next to reflecting surface 144.

Figure 3A:
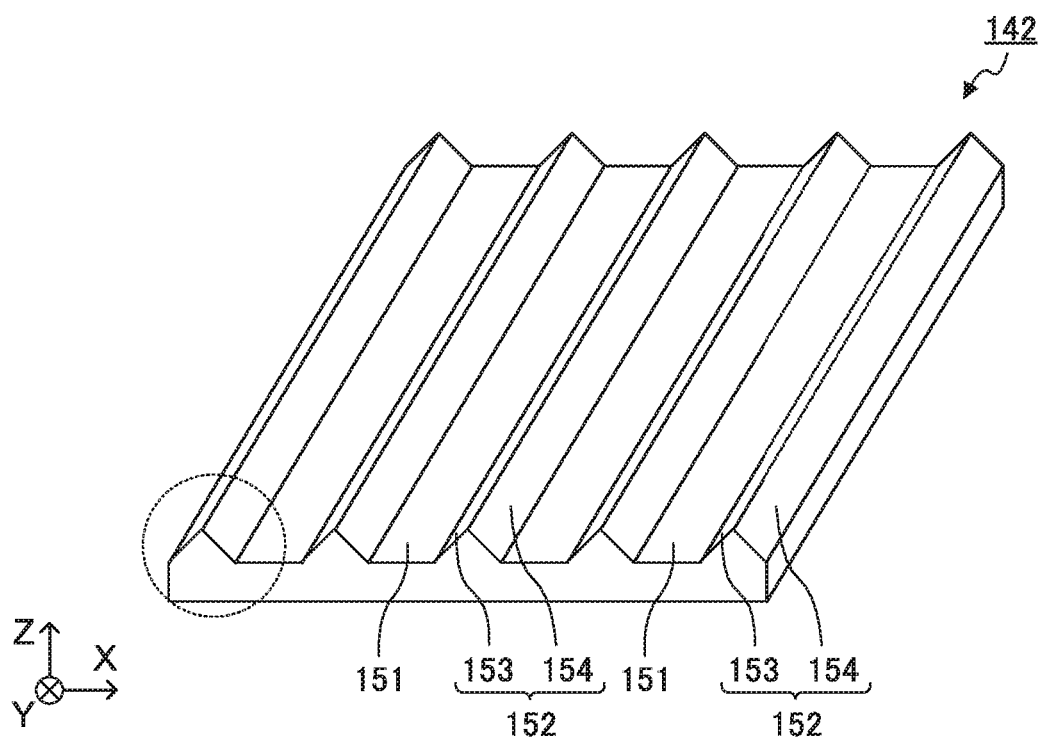
FIGS. 3A and 3B illustrate a configuration of an attenuation part.
Figure 3B:
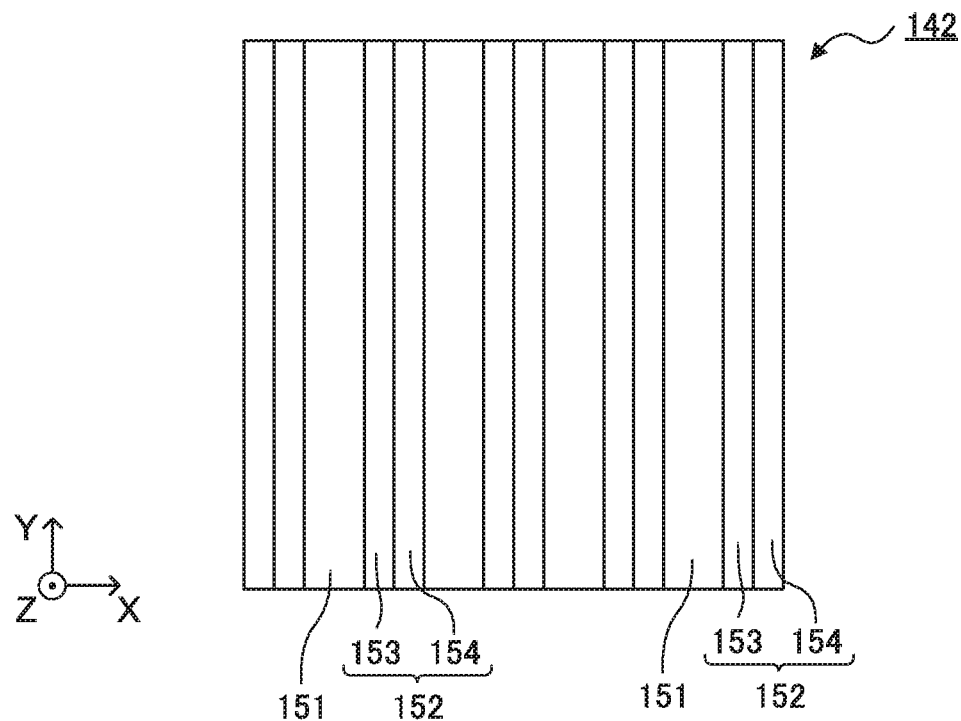
Figure 4A:
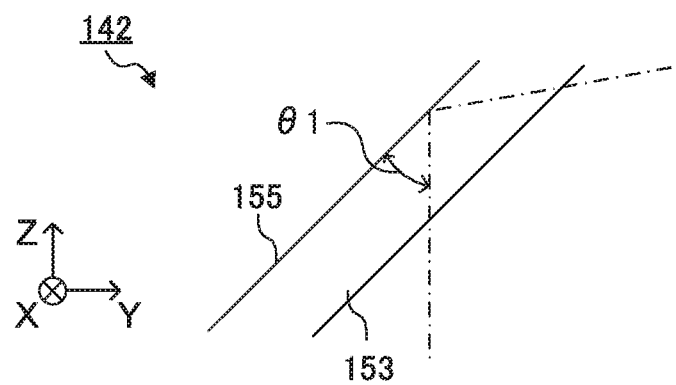
FIGS. 4A to 4C also illustrate a configuration the attenuation part.
Figure 4B:
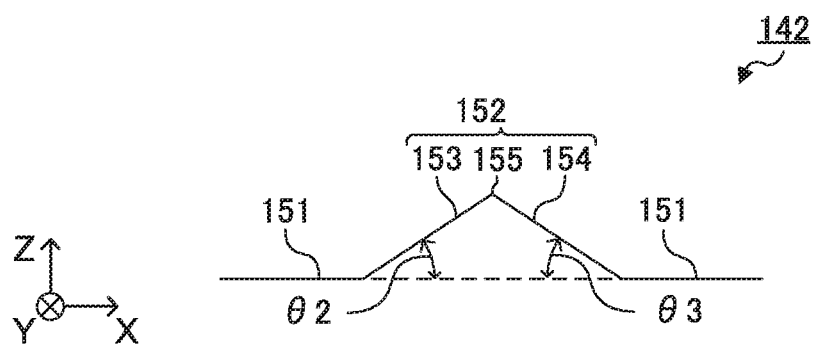
Figure 4C:
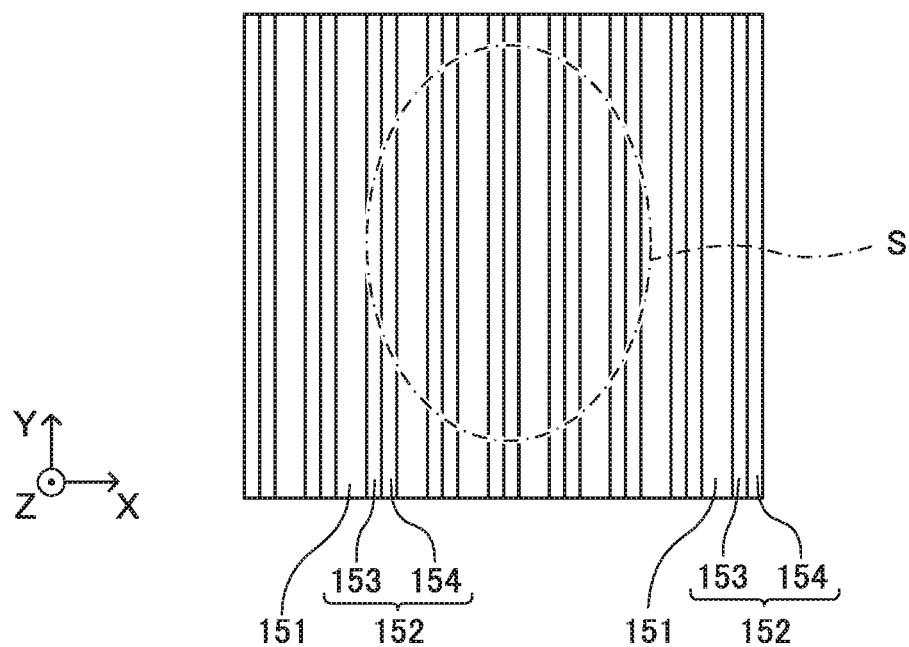

Next, a configuration of attenuation part 142 is elaborated. FIGS. 3A to 4C are partially enlarged views illustrating a configuration of attenuation part 142. FIG. 3A is a partially enlarged perspective view of attenuation part 142, and FIG. 3B is a partially enlarged plan view of attenuation part 142. FIG. 4A is a partially enlarged schematic view illustrating attenuation part 142 as viewed along the X direction, FIG. 4B is a partially enlarged sectional view of the region indicated with the broken line in FIG. 3A, and FIG. 4C is a diagram for describing the light attenuation rate.

Attenuation part 142 includes a plurality of first reflection parts 151 and a plurality of second reflection parts 152. First reflection part 151 is a reflecting surface that reflects, toward second optical surface 143, a part of the light entered from first optical surface 141. Second reflection part 152 is a reflection part that reflects, toward the part other than second optical surface 143, another part of the light entered from first optical surface 141.

As illustrated in FIGS. 3A, 3B, 4A and 4B, first reflection part 151 extends along a plane (XY plane) including the optical axis of the light between first optical surface 141 and attenuation part 142 (X direction) and the optical axis of the light between attenuation part 142 and second optical surface 143 (Y direction). First reflection part 151 is tilted such that the distance to optical transmission member 160 (front surface) decreases in the direction from the bottom surface toward the top surface of optical receptacle 140. The inclination angle of first reflection part 151 is not limited as long as the light entered from first optical surface 141 can be reflected toward second optical surface 143. In the present embodiment, inclination angle θ1 of first reflection part 151 is 45° with respect to the optical axis of the light incident on first reflection part 151. In this case, a part of the light entered from first optical surface 141 impinges on first reflection part 151 at an incident angle greater than a critical angle. The shape of first reflection part 151 is not limited. In the present embodiment, first reflection part 151 has a shape of a flat surface. The number of first reflection parts 151 is not limited. The number and planar dimension of first reflection parts 151 are set in accordance with the desired attenuation rate.

As illustrated in FIGS. 3A, 3B, 4A and 4B, second reflection part 152 reflects, toward the part other than second optical surface 143, the light entered from first optical surface 141. Second reflection part 152 is tilted such that the distance to optical transmission member 160 (front surface) decreases in the direction from the bottom surface toward the top surface of optical receptacle 140. Second reflection part 152 extends along a plane (XY plane) including the optical axis of the light between first optical surface 141 and attenuation part 142 (X direction), the optical axis of the light between attenuation part 142 and second optical surface 143 (Y direction).

The configuration of second reflection part 152 is not limited as long as the above-described function can be achieved. Second reflection part 152 may be a ridge or a valley. In the present embodiment, second reflection part 152 is a ridge including flat first division reflection surface 153, flat second division reflection surface 154, and ridgeline 155 connecting first division reflection surface 153 and second division reflection surface 154.

As illustrated in FIG. 4B, first division reflection surface 153 and second division reflection surface 154 are tilted with respect to first reflection part 151. Inclination angle θ2 of first division reflection surface 153 with respect to first reflection part 151 is not limited as long as the above-described function can be achieved. Preferably, inclination angle θ2 of first division reflection surface 153 with respect to first reflection part 151 meets 32°≤θ2≤42°. When θ2 meets the above-described condition, the light having reached first division reflection surface 153 is reliably internally reflected toward regions other than second optical surface 143. On the other hand, when θ2 is greater than 42°, the light reflected at first division reflection surface 153 may be reflected at second division reflection surface 154, and may impinge on second optical surface 143.

Likewise, inclination angle θ3 of second division reflection surface 154 with respect to first reflection part 151 is not limited as long as the above-described function can be achieved. Preferably, inclination angle θ3 of second division reflection surface 154 with respect to first reflection part 151 meets 32°≤θ3≤42°. When θ3 meets the above-described condition, the light having reached second division reflection surface 154 is reliably internally reflected toward regions other than second optical surface 143. When θ3 is greater than 42°, the light reflected at first division reflection surface 153 may be reflected at second division reflection surface 154, and may impinge on second optical surface 143.

The direction in which the light reflected at second reflection part 152 advances is not limited as long as it advances toward regions other than second optical surface 143. The light reflected at second reflection part 152 may advance in the direction toward the bottom surface of optical receptacle 140, or toward the top surface of optical receptacle 140, or, toward the front surface of optical receptacle 140. From the view point of safety, it is preferable that the light reflected at second reflection part 152 advance toward the front surface of optical receptacle 140. By setting inclination angle θ2 and inclination angle θ3 at an upper limit value at which reflected light does not impinge on the other division reflection surface, the light can be delivered to a location farther away from second optical surface 143.

Ridgeline 155 connects first division reflection surface 153 and second division reflection surface 154. In the present embodiment, ridgeline 155 is a straight line that is parallel to first reflection part 151 in the YZ plane.

First reflection part 151 and second reflection part 152 are alternately disposed in the arrangement direction (X direction) of first optical surface 141. First reflection part 151 and second reflection part 152 may be adjacent to each other, or spaced away from each other. In the present embodiment, first reflection part 151 and second reflection part 152 are adjacent to each other.

As illustrated in FIG. 4C, the plurality of first reflection parts 151 and the plurality of second reflection parts 152 are located in irradiation spot S of light applied to attenuation part 142. The attenuation rate of the light depends on the area ratio between first reflection part 151 and second reflection part 152 in irradiation spot S. Specifically, the attenuation rate of the light depends on the area ratio between first reflection part 151 and second reflection part 152 in plan view of attenuation part 142. For example, when the area ratio between first reflection part 151 and second reflection part 152 in irradiation spot S is 1:1, light attenuation rate is 50%, and when the area ratio is 3:1, the light attenuation rate is 25%.

The number of first reflection parts 151 and second reflection parts 152 in irradiation spot S is appropriately set based on the above-described attenuation rate.

FIGS. 5A to 5C illustrate light paths of light emitted from light emission element and reflected at first reflection part 151. FIG. 5A illustrates light paths in a YZ plane, FIG. 5B illustrates light paths in plan view, and FIG. 5C illustrates light paths in front view. Note that FIGS. 5A to 5C schematically illustrate only first optical surface 141, second optical surface 143, and first reflection part 151.

As illustrated in FIGS. 5A to 5C, light emitted from light emission element (photoelectric conversion element 122) enters optical receptacle 140 from first optical surface 141. Next, the light entered from first optical surface 141 reaches first reflection part 151 of attenuation part 142. Since first reflection part 151 has angle θ1 of 45° with respect to the optical axis of the light entered from first optical surface 141 in the present embodiment as described above, the light having reached first reflection part 151 is internally reflected at an angle of 45° with respect to first reflection part 151 and advances toward second optical surface 143.

FIGS. 6A to 7C illustrate light paths of light emitted from light emission element and reflected at second reflection part 152. FIG. 6A illustrates light paths in a YZ plane, FIG. 6B illustrates light paths in plan view, and FIG. 6C illustrates light paths in front view. Note that FIGS. 6A to 6C schematically illustrate only first optical surface 141, second optical surface 143, and second reflection part 152. FIG. 7A illustrates light paths of light reflected at second reflection part 152 as viewed in an oblique direction, FIG. 7B is a perspective view of optical receptacle 140 taken along a plane including the optical axis of light reflected at second reflection part 152 and the optical axis of light entered from first optical surface 141, and FIG. 7C illustrates light paths in the cross-section as viewed from the normal direction. Note that, in FIGS. 7B and 7C, hatching on optical receptacle 140 is omitted to illustrate light paths in optical receptacle 140.

As illustrated in FIGS. 6A to 7C, the light emitted from light emission element (photoelectric conversion element 122) enters optical receptacle 140 from first optical surface 141. Next, the light entered from first optical surface 141 reaches second reflection part 152 (in the present embodiment, first division reflection surface 153) of attenuation part 142.

The light having reached second reflection part 152 is reflected toward the front surface side of optical receptacle 140. More specifically, in plan view of optical receptacle 140, the travelling direction of the light reflected at second reflection part 152 is shifted to the X direction so as to avoid second optical surface 143. Then, the light is emitted to the outside from the front surface of optical receptacle 140 where second optical surface 143 is disposed.

In addition, in side view of optical receptacle 140, the travelling direction of the light reflected at second reflection part 152 is shifted to the Z direction so as to avoid second optical surface 143. More specifically, the light reflected at second reflection part 152 advances to the top surface side relative to second optical surface 143.

Effect

The optical receptacle according to the present embodiment includes the attenuation part that attenuates the light emitted from light emission element and entered from the first optical surface. Therefore, the light emitted from the light emission element can be attenuated without providing an attenuation filter that attenuates light, and without performing secondary processing such as attenuation coating. In addition, occurrence of crack due to attenuation coating and an adhesive agent for disposing other members can be prevented. In addition, even in the case where the optical receptacle is used for transmission and reception as in the optical receptacle according to the present embodiment, processing is easily performed since it suffices to provide the attenuation part only in a region functioning as the transmission side.

Figure 8A:
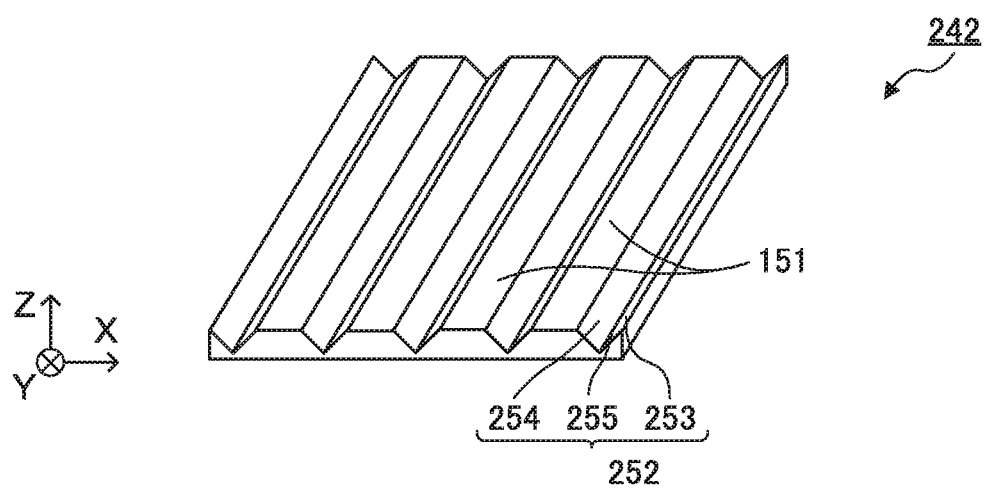
FIGS. 8A to 8C are perspective views for describing an attenuation part according to a modification of Embodiment 1.
Figure 8B:
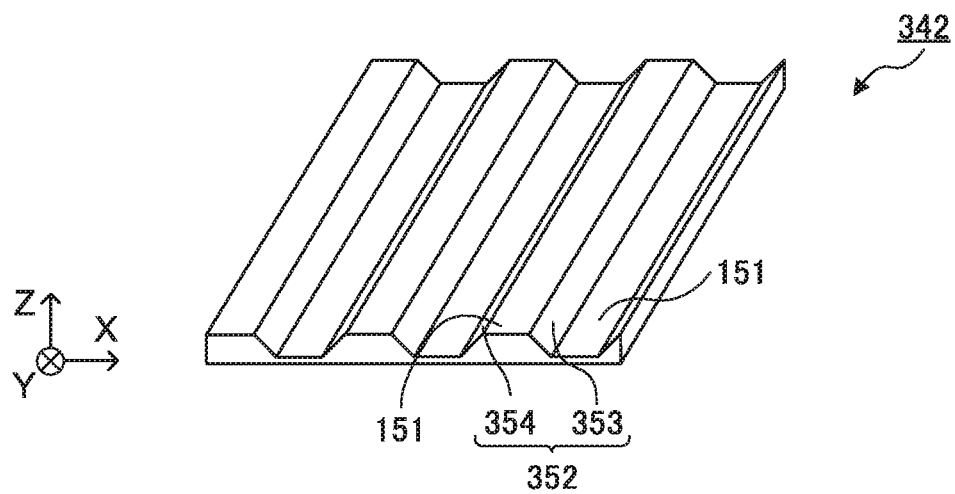
Figure 8C:
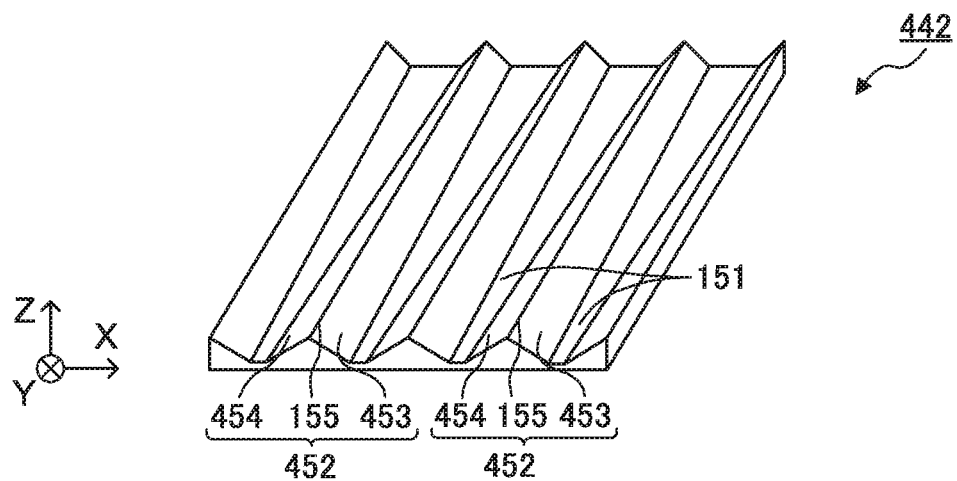

While second reflection part 152 of attenuation part 142 is a ridge in the present embodiment, the shape of second reflection part 152 is not limited to this. FIGS. 8A to 8C are perspective views of attenuation parts 242, 342 and 442 of optical receptacle 140 according to a modification of Embodiment 1. As illustrated in FIG. 8A, second reflection part 252 of attenuation part 242 may be a valley. In this case, second reflection part 252 includes first division reflection surface 253, second division reflection surface 254, and valley line 255 that connects first division reflection surface 253 and second division reflection surface 254. In addition, as illustrated in FIG. 8B, in second reflection part 352 of attenuation part 342, first reflection part 151 may be disposed between first division reflection surface 353 and second division reflection surface 354. In addition, as illustrated in FIG. 8C, second reflection part 452 may be formed such that the sizes of first division reflection surface 453 and second division reflection surface 454 are changed in the direction from one end (e.g., lower side end) toward the other end (e.g., upper side end).

Embodiment 2

Configuration of Optical Module

Optical module 500 according to Embodiment 2 differs from optical module 100 according to Embodiment 1 in that a mechanism that detects whether light is appropriately emitted from the light emission element mainly. Therefore, the components identical to those of optical module 100 according to Embodiment 1 are denoted with the same reference numerals and the description is omitted, while the feature thereof is described.

Figure 9:
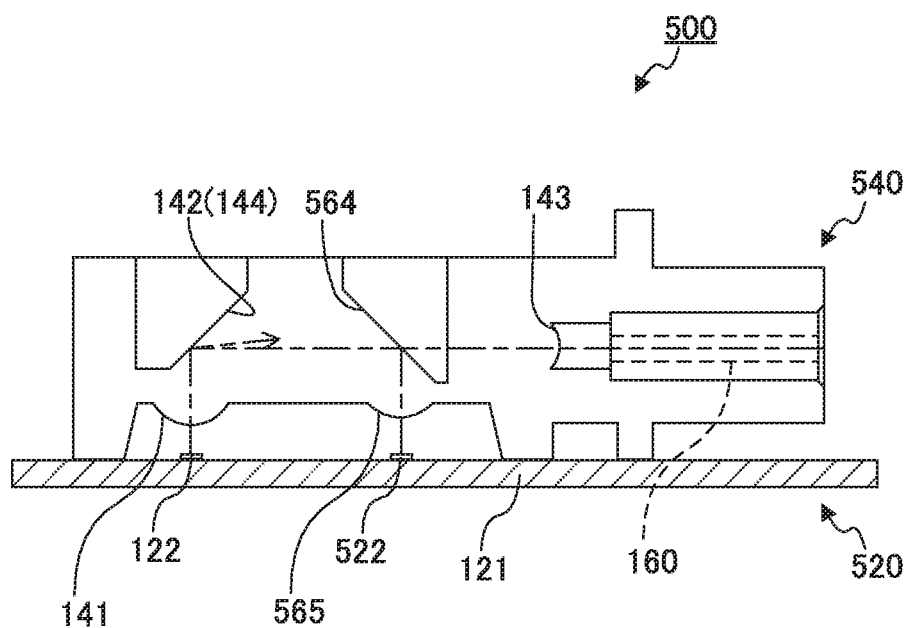
FIG. 9 is a sectional view of an optical module according to Embodiment 2.

FIG. 9 is a sectional view of optical module 500 according to Embodiment 2. In FIG. 9, hatching on the cross-section of optical receptacle 540 is omitted to illustrate light paths in optical receptacle 540.

Optical module 500 according to Embodiment 2 includes light source conversion device 520 and optical receptacle 540.

Light source conversion device 520 according to the present embodiment includes substrate 121, one or more transmitting or receiving photoelectric conversion elements 122, and detection device 522 for monitor light. On substrate 121, a plurality of detection devices 522 is disposed in addition to the light emission element and the light reception element (that are photoelectric conversion elements 122) and optical receptacle 540. Detection device 522 is a photodetector, for example. The number of detection devices 522 is equal to the number of the light emission elements. In the present embodiment, four light emission elements are disposed, and accordingly four detection devices 522 are disposed. In addition, four detection devices 522 is arranged parallel to the arrangement direction of the four light emission elements.

Configuration of Optical Receptacle

Optical receptacle 540 includes light separation part 564 and third optical surface 565 in addition to first optical surface 141, attenuation part 142, and second optical surface 143.

Light separation part 564 separates another part (preferably the remaining part) of the light entered from first reflection part 151 into light travelling toward third optical surface 565 (or detection device 522) and light travelling toward second optical surface 143 (or the end surface of optical transmission member 160).

The configuration of light separation part 564 is not limited as long as the above-described function can be achieved. Although not illustrated in the drawings, in the present embodiment, light separation part 564 includes a plurality of division transmission surfaces that allows, to pass therethrough, a part of light reflected at first reflection part 151, and a plurality of division reflection surfaces that reflects, toward third optical surface 565, another part of the light reflected at first reflection part 151. In the present embodiment, the division transmission surface is a flat surface perpendicular to the optical axis of the light reflected at first reflection part 151. In addition, in the present embodiment, the division reflection surface is a flat surface tilted with respect to the optical axis of the light reflected at first reflection part 151.

Third optical surface 565 is disposed in the bottom surface side of optical receptacle 540 in such a manner as to face detection device 522. In the present embodiment, third optical surface 565 is a lens surface protruding toward convex detection device 522. Third optical surface 565 converges light separated at the division reflection surface of light separation part 564 and emits the light toward detection device 522. In this manner, the light can be efficiently coupled to detection device 522. Preferably, the central axis of third optical surface 565 is perpendicular to the light-receiving surface (substrate 121) of detection device 522.

Effect

Optical module 500 according to Embodiment 2 has an effect similar to that of optical module 100 according to Embodiment 1.

While optical receptacles 140 and 540 are used in transmitting and receiving optical modules 100 and 500 in the above-mentioned embodiment, optical modules 100 and 500 according to the embodiments of the present invention may be used in an optical module dedicated to transmission. In this case, the optical module includes only light emission elements as the plurality of photoelectric conversion elements 122. Further, in the case where photoelectric conversion element 122 is one light emission element and angle θ1 of first reflection part 151 with respect to the optical axis of the light entered from first optical surface 141 is 45°, inclination angles θ2 and θ3 of first division reflection surface 153 and first division reflection surface 153 with respect to second reflection part 152 preferably meet 7°<θ2 and θ3<42°, respectively. Note that in the case where the photoelectric conversion element is one light emission element, the light reflected at second reflection part 152 does not reach second optical surface 143 even with a smaller shift amount to the X direction than in Embodiment 1. Accordingly, in the case where the photoelectric conversion element is one light emission element, the lower limit value of θ2 and θ3 is smaller than that of Embodiment 1.

In plan view of optical receptacle 540, the light path of the light reflected at second reflection part 152 can be adjusted by appropriately providing a direction conversion adjustment mechanism for adjusting the light path in optical receptacle 540. By directing the light reflected at second reflection part 152 (also referred to as L2) in the direction different from the light reflected at first reflection part 151 (also referred to as L1), a direction conversion adjustment mechanism that is effective only for reflected light L2 can be appropriately provided, and thus reflected light L2 can be adjusted such that the light does not reach detection device 522 and optical transmission member 160. Examples of the direction conversion adjustment mechanism include a coating surface and an inclined surface formed in an arrival region of reflected light L2 different from an arrival region of reflected light L1 in each surface of optical receptacle 540.

This application is entitled to and claims the benefit of Japanese Patent Application No. 2018-043174 filed on Mar. 9, 2018, the disclosure each of which including the specification, drawings and abstract is incorporated herein by reference in its entirety.

INDUSTRIAL APPLICABILITY

The optical receptacle and the optical module according to the embodiments of the present invention are suitable for optical communications using an optical transmission member.

REFERENCE SIGNS LIST 100, 500 Optical module
120, 520 Photoelectric conversion device
121 Substrate
122 Photoelectric conversion element
123 Substrate-side protrusion
140, 540 Optical receptacle
141 First optical surface
142, 242, 342, 442 Attenuation part
143 Second optical surface
144 Reflecting surface
151 First reflection part
152 Second reflection part
153, 253, 353, 453 First division reflection surface
154, 254, 354, 454 Second division reflection surface
155 Ridgeline
160 Optical transmission member
161 Ferrule
162 Ferrule-side recess
255 Valley line
522 Detection device
564 Light separation part
565 Third optical surface
θ1 Inclination angle of first reflection part
θ2 Inclination angle of first division reflection surface
θ3 Inclination angle of second division reflection surface

What is claimed is:

1. An optical receptacle configured to optically couple one or more light emission elements and an end surface of one or more optical transmission members when the optical receptacle is disposed between the one or more optical transmission members and a photoelectric conversion device in which the one or more light emission elements are disposed on a substrate, the optical receptacle comprising:
one or more first optical surfaces configured to allow incidence of light emitted from the one or more light emission elements;
one or more second optical surfaces configured to emit, toward the one or more optical transmission members, light emitted from the one or more light emission elements and travelled inside the optical receptacle;
an attenuation part configured to reflect, toward the one or more second optical surfaces, a first part of light entered from the one or more first optical surfaces, and reflect, toward a part other than the one or more second optical surfaces, a second part of the light entered from the one or more first optical surfaces,
wherein the attenuation part includes:
a plurality of first reflection parts configured to reflect, toward the one or more second optical surfaces, the first part of the light entered from the one or more first optical surfaces, and
a plurality of second reflection parts configured to reflect, toward the part other than the one or more second optical surfaces, the second part of the light entered from the one or more first optical surfaces,
wherein the plurality of first reflection parts and the plurality of second reflection parts are alternately disposed in a direction perpendicular to an optical axis of light between the one or more first optical surfaces and the plurality of first reflection parts and to an optical axis of light between the plurality of first reflection parts and the one or more second optical surfaces, and
wherein the plurality of first reflection parts and the plurality of second reflection parts extend along a plane including the optical axis of the light between the one or more first optical surfaces and the plurality of first reflection parts, and the optical axis of the light between the plurality of first reflection parts and the one or more second optical surfaces.

2. The optical receptacle according to claim 1, wherein each of the plurality of second reflection parts is a ridge having a ridgeline extending along the plane, or a valley having a valley line extending along the plane.

3. The optical receptacle according to claim 2, further comprising:
- a light separation part configured to separate a part of light reflected at the plurality of first reflection parts into light travelling toward the one or more second optical surfaces and light travelling toward one or more detection devices configured to monitor the light emitted from the one or more light emission elements; and
- one or more third optical surfaces configured to emit, toward the detection device, the light separated at the light separation part.

4. The optical receptacle according to claim 3,
- wherein the one or more first optical surfaces are two or more first optical surfaces;
- wherein the one or more second optical surfaces are two or more second optical surfaces; and
- wherein the two or more first optical surfaces and the two or more second optical surfaces are disposed in the direction perpendicular to the optical axis of the light between the two or more first optical surfaces and the plurality of first reflection parts and to the optical axis of the light between the plurality of first reflection parts and the two or more second optical surfaces.

5. An optical module, comprising:
- a photoelectric conversion device including a substrate and one or more light emission elements disposed on the substrate; and
- the optical receptacle according to claim 4.

6. An optical module, comprising:
- a photoelectric conversion device including a substrate and one or more light emission elements disposed on the substrate; and
- the optical receptacle according to claim 3.

7. The optical receptacle according to claim 2,
- wherein the one or more first optical surfaces are two or more first optical surfaces;
- wherein the one or more second optical surfaces are two or more second optical surfaces; and
- wherein the two or more first optical surfaces and the two or more second optical surfaces are disposed in the direction perpendicular to the optical axis of the light between the two or more first optical surfaces and the plurality of first reflection parts and to the optical axis of the light between the plurality of first reflection parts and the two or more second optical surfaces.

8. An optical module, comprising:
- a photoelectric conversion device including a substrate and one or more light emission elements disposed on the substrate; and
- the optical receptacle according to claim 7.

9. An optical module, comprising:
- a photoelectric conversion device including a substrate and one or more light emission elements disposed on the substrate; and
- the optical receptacle according to claim 2.

10. The optical receptacle according to claim 1 or 2, further comprising:
- a light separation part configured to separate a part of light reflected at the plurality of first reflection parts into light travelling toward the one or more second optical surfaces and light travelling toward one or more detection devices configured to monitor the light emitted from the one or more light emission elements; and
- one or more third optical surfaces configured to emit, toward the detection device, the light separated at the light separation part.

11. The optical receptacle according to claim 10,
- wherein the one or more first optical surfaces are two or more first optical surfaces;
- wherein the one or more second optical surfaces are two or more second optical surfaces; and
- wherein the two or more first optical surfaces and the two or more second optical surfaces are disposed in the direction perpendicular to the optical axis of the light between the two or more first optical surfaces and the plurality of first reflection parts and to the optical axis of the light between the plurality of first reflection parts and the two or more second optical surfaces.

12. An optical module, comprising:
- a photoelectric conversion device including a substrate and one or more light emission elements disposed on the substrate; and
- the optical receptacle according to claim 11.

13. An optical module, comprising:
- a photoelectric conversion device including a substrate and one or more light emission elements disposed on the substrate; and
- the optical receptacle according to claim 10.

14. The optical receptacle according to claim 1,
- wherein the one or more first optical surfaces are two or more first optical surfaces;
- wherein the one or more second optical surfaces are two or more second optical surfaces; and
- wherein the two or more first optical surfaces and the two or more second optical surfaces are disposed in the direction perpendicular to the optical axis of the light between the two or more first optical surfaces and the plurality of first reflection parts and to the optical axis of the light between the plurality of first reflection parts and the two or more second optical surfaces.

15. An optical module, comprising:
- a photoelectric conversion device including a substrate and one or more light emission elements disposed on the substrate; and
- the optical receptacle according to claim 14.

16. An optical module, comprising:
- a photoelectric conversion device including a substrate and one or more light emission elements disposed on the substrate; and
- the optical receptacle according to claim 1.

* * * * *